(12) United States Patent  (10) Patent No.: US 10,956,087 B2
Huang et al.  (45) Date of Patent: Mar. 23, 2021

(54) MEMORY CONTROLLER HAVING TEMPERATURE DEPENDENT DATA PROGRAM SCHEME AND RELATED METHOD

(71) Applicant: RAYMX Microelectronics Corp., Hefei (CN)

(72) Inventors: Shih-Fu Huang, Taoyuan (TW); Cheng-Yu Chen, New Taipei (TW)

(73) Assignee: RAYMX MICROELECTRONICS CORP., Hefei (CN)

( * ) Notice: Subject to any disclaimer, the term of this patent is extended or adjusted under 35 U.S.C. 154(b) by 0 days.

(21) Appl. No.: 16/405,195

(22) Filed: May 7, 2019

(65) Prior Publication Data

US 2020/0310687 A1  Oct. 1, 2020

(30) Foreign Application Priority Data

Apr. 1, 2019 (CN) .......................... 201910256211.4

(51) Int. Cl.
  *G06F 3/06* (2006.01)
(52) U.S. Cl.
  CPC ............ *G06F 3/0659* (2013.01); *G06F 3/064* (2013.01); *G06F 3/0619* (2013.01); *G06F 3/0653* (2013.01); *G06F 3/0679* (2013.01)
(58) Field of Classification Search
  CPC ....... G06F 3/064; G06F 3/0679; G06F 3/0619
  See application file for complete search history.

(56) References Cited

U.S. PATENT DOCUMENTS

| | | | | |
|---|---|---|---|---|
| 8,886,877 B1* | 11/2014 | Avila | ................. | G06F 12/0638 |
| | | | | 711/103 |
| 9,477,587 B2* | 10/2016 | Wong | ..................... | G06F 3/065 |
| 2011/0010493 A1* | 1/2011 | Kimura | ................. | H03K 19/20 |
| | | | | 711/103 |
| 2012/0079167 A1* | 3/2012 | Yao | ..................... | G06F 12/0246 |
| | | | | 711/103 |
| 2012/0224425 A1* | 9/2012 | Fai | ...................... | G11C 11/5642 |
| | | | | 365/185.09 |
| 2013/0265825 A1* | 10/2013 | Lassa | .................... | G06F 3/0649 |
| | | | | 365/185.11 |
| 2014/0281170 A1* | 9/2014 | Cho | ........................ | G06F 8/63 |
| | | | | 711/103 |
| 2018/0032275 A1* | 2/2018 | Pahwa | ................. | G11C 29/028 |
| 2018/0081594 A1* | 3/2018 | Jung | ..................... | G06F 3/0613 |
| 2018/0260331 A1* | 9/2018 | Kotte | .................. | G06F 12/0246 |
| 2018/0293009 A1* | 10/2018 | Sharon | ............... | G11C 11/5628 |

* cited by examiner

*Primary Examiner* — Ramon A. Mercado
(74) *Attorney, Agent, or Firm* — McClure, Qualey & Rodack, LLP

(57) ABSTRACT

A memory controller includes: an interface configured to operably communicate with a host device; a temperature detecting circuit configured to operably detect an ambient temperature, wherein when the ambient temperature is beyond a predetermined temperature range, the temperature detecting circuit generates a control signal; and a processing circuit coupled to the interface and the temperature detecting circuit, for selecting one of a plurality of data program schemes to program data into a first storage block of a flash memory according to the control signal.

10 Claims, 3 Drawing Sheets

MEMORY CONTROLLER HAVING TEMPERATURE DEPENDENT DATA PROGRAM SCHEME AND RELATED METHOD

CROSS-REFERENCE TO RELATED APPLICATIONS

This application claims the benefit of priority to Patent Application No. 201910256211.4, filed in China on Apr. 1, 2019; the entirety of which is incorporated herein by reference for all purposes.

BACKGROUND

The disclosure generally relates to a flash memory controller and, more particularly, to a controller to increase the data reliability in a flash memory.

Flash memory may be applied in various applications, such as solid-state drive, memory card, digital camera, digital camcorder, multi-media player, mobile phone, computer, transportation, and other electronic devices. These electronic devices may be operated under different ambient temperatures.

It is well known that the extreme temperature conditions are becoming more common, and the extreme temperature may increase the variation of ambient temperature of electronic devices. For example, the flash memory is quite sensitive to the ambient temperature during data writing and reading. Therefore, when the variation of ambient temperature of the flash memory increases, the data error problem may arise.

SUMMARY

An example embodiment of a memory controller is disclosed. The memory controller comprises: an interface configured to operably communicate with a host device; a temperature detecting circuit configured to operably detect an ambient temperature, wherein when the ambient temperature is beyond a predetermined temperature range, the temperature detecting circuit generates a control signal; and a processing circuit coupled to the interface and the temperature detecting circuit, for selecting one of a plurality of data program schemes to program data into a first storage block of a flash memory according to the control signal.

An example embodiment of a memory controller is disclosed. The memory controller comprises: a temperature detecting circuit configured to operably detect an ambient temperature, wherein when the ambient temperature is beyond a predetermined temperature range, the temperature detecting circuit generates a control signal; and a processing circuit coupled to the temperature detecting circuit, for reprogramming data stored in a first storage block of a flash memory into a second storage block of the flash memory according to the control signal; wherein a first storage unit of the first storage block is a first bit number, a second storage unit of the second storage block is a second bit number, and the first bit number is larger than the second bit number.

An example embodiment of a method of controlling a flash memory. The method comprises: detecting an ambient temperature of a flash memory; generating a control signal when the ambient temperature is beyond a predetermined temperature range; and selecting one of a plurality of data program schemes to program data into a first storage block of the flash memory according to the control signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
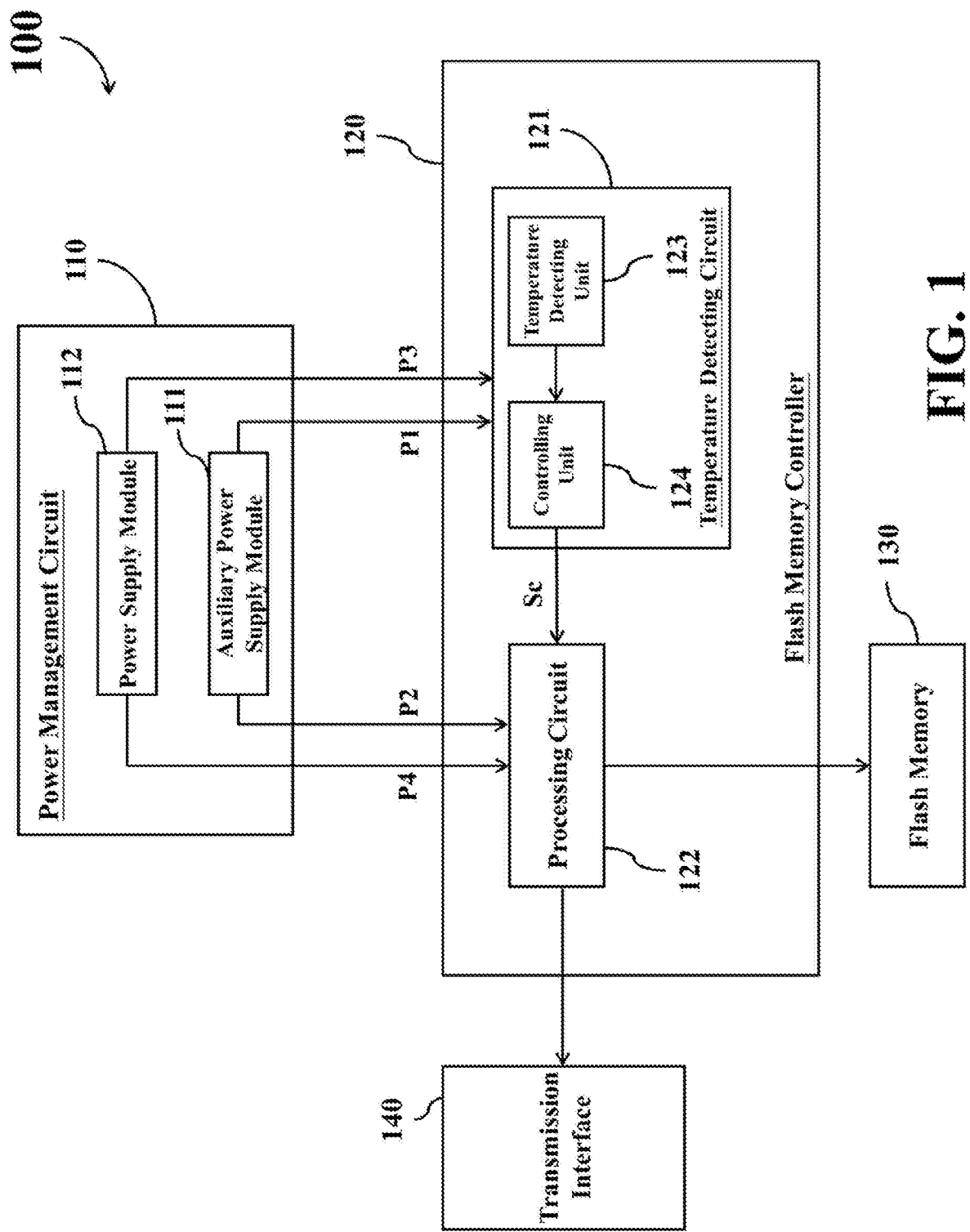
FIG. 1 shows a simplified functional block of a data storage system according to an embodiment of the present disclosure.

FIG. 1 shows a simplified functional block of a data storage system 100 according to an embodiment of the present disclosure. The data storage system 100 comprises a power management circuit 110, a flash memory controller 120, a flash memory 130, and a transmission interface 140. The power management circuit 110 is coupled to the flash memory controller 120, and is configured to operably provide supply power to the flash memory controller 120. The flash memory controller 120 is coupled to the flash memory 130, and is configured to operably write data into or read data from the flash memory 130.

The transmission interface 140 is coupled to the flash memory controller 120, and is operably to receive data to be written into the flash memory 130 or to output data from the flash memory 130. The transmission interface 140 is configured to operably perform data communication with a host device (not shown in FIG. 1). In practice, the transmission interface 140 may be implemented by interfacing circuit conforming to various transmission standards such as Serial Advanced Technology Attachment (SATA), Peripheral Component Interconnect express (PCIe), and/or Universal Serial Bus (USB).

The flash memory controller 120 at least comprises a temperature detecting circuit 121 and a processing circuit 122. The temperature detecting circuit 121 is coupled to the processing circuit 122, and is configured to continuously detect an ambient temperature of the flash memory controller 120. In other words, the temperature detecting circuit 121 may alternately detect the ambient temperature of the flash memory controller 120 when the flash memory controller 120 operates in a normal operating mode and a sleep mode. When the ambient temperature is beyond a predetermined temperature range Rn, the temperature detecting circuit 121 may generate a control signal Sc to the processing circuit 122. The control signal Sc may comprise an information related to the ambient temperature. When the processing circuit 122 operates in the sleep mode, the control signal Sc may be used to wake up the processing circuit 122. Accordingly, the processing circuit 122 may select an appropriate data program scheme to program the data according to the extent of ambient temperature beyond the predetermined temperature range Rn, and write the programmed data into the flash memory 130. It is noted that, in this embodiment, the control signal Sc may include the information of the ambient temperature. However, this is not a limitation of the present disclosure. The information of the ambient temperature may be independently transmitted to the processing circuit 122.

In addition, the ambient temperature may be the environment temperature of the flash memory 130, the flash memory controller 120, or the data storage system 100, or may be the temperatures themselves.

Please note that, for brevity, the processing circuit 122 in this embodiment is defined to have the ability of accessing data with the flash memory 130. In practice, however, the flash memory controller 120 may further comprise an accessing circuit (not shown in FIG. 1) configured to access the flash memory 130 according to the commands of the processing circuit 122.

When the ambient temperature falls within a predetermined temperature range, the processing circuit 122 is arranged to use a predetermined data program scheme to program the data, and to write or store the programmed data into a first storage block of the flash memory 130. When the ambient temperature is beyond the predetermined temperature range Rn, the processing circuit 122 is arranged to select a data program scheme from a plurality of data program schemes to program the data according to the control signal Sc, and to write the programmed data into a second storage block of the flash memory 130. In one embodiment, the different data program schemes may access different storage blocks in the flash memory 130 respectively, and the processing circuit 122 may store the relationships of the data program schemes and the corresponding accessed storage blocks respectively into a storage unit in the flash memory controller 120. The storage unit, i.e. the first storage unit, in the first storage block is arranged to store a first bit number. The storage unit, i.e. the second storage unit, in the second storage block is arranged to store a second bit number. The first bit number is larger than the second bit number.

For example, when the flash memory 130 is a 3D NAND flash memory, the storage unit inside the flash memory 130 may be configured to be a form of single-level cell (SLC), multi-level cell (MLC), triple-level cell (TLC), quad-level cell (QLC), or storage unit with higher level cell. The single-level cell is arranged to store data programed by 1-bit program scheme, i.e. one-bit-per-cell (1bpc). The multi-level cell is arranged to store data programed by 2-bit program scheme, i.e. two-bit-per-cell (2bpc). The triple-level cell is arranged to store data programed by 3-bit program scheme, i.e. three-bit-per-cell (3bpc). The quad-level cell is arranged to store data programed by 4-bit program scheme, i.e. four-bit-per-cell (4bpc), and so on. For description purposes, the storage units that are arranged to store data processed by a 4-bit program scheme, a 3-bit program scheme, a 2-bit program scheme, and a 1-bit program scheme are simplified as "quad-level cells", "triple-level cells", "multi-level cells", and "single-level cells" respectively.

In practice, the above mentioned first storage unit may be the quad-level cell. The second storage unit may be one of the single-level cell, the multi-level cell, and the triple-level cell.

The temperature detecting circuit 121 comprises a temperature detecting unit 123 and a controlling unit 124. The temperature detecting unit 123 is coupled to the controlling unit 124, and is configured to alternately detect the current ambient temperature of the flash memory controller 120, and to transmit the detected ambient temperature to the controlling unit 124. The controlling unit 124 is configured to determine if the ambient temperature is beyond the predetermined temperature range Rn and/or to determine the extent of ambient temperature beyond the predetermined temperature range Rn. For example, the predetermined temperature range Rn may be a normal operation temperature range of the flash memory 130, e.g. −25° C. to 75° C. It is noted that this range is not a limitation of the present disclosure. The predetermined temperature range may have different ranges depending on the different manufacturers of the flash memory. When the controlling unit 124 determines that the ambient temperature is beyond the predetermined temperature range Rn, the controlling unit 124 may generate the control signal Sc to the processing circuit 122 such that an appropriate data program scheme corresponding to the ambient temperature may be applied to write the data into the flash memory 130. In addition, the controlling unit 124 is configured to compare the predetermined temperature range Rn and the ambient temperature received from the temperature detecting unit 123, to determine the extent of ambient temperature beyond predetermined temperature range Rn, and to generate the control signal Sc accordingly.

It is noted that the present disclosure has not limited the implementations of the temperature detecting unit 123. The temperature detecting unit 123 may be implemented by semiconductor device or thermocouple. In another embodiment, the temperature detecting unit 123 may be installed external to the flash memory controller 120, or embedded in the flash memory controller 120 or the flash memory 130.

Figure 2:
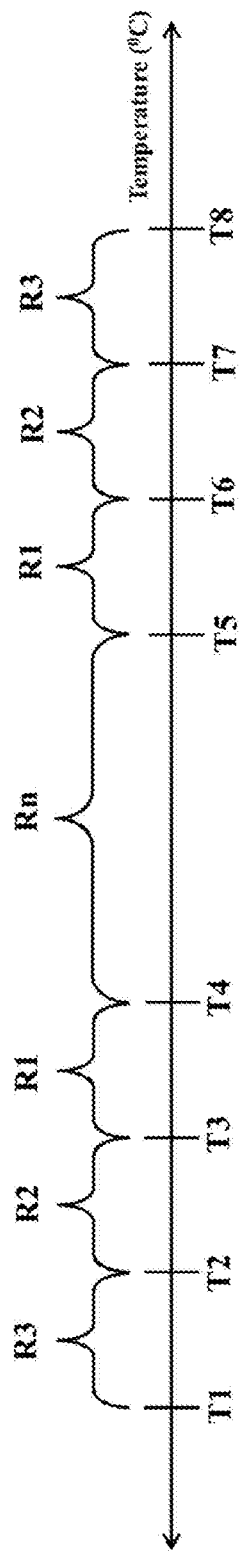
FIG. 2 shows a diagram illustrating the distribution of ambient temperature according to an embodiment of the present disclosure.

In one embodiment, the controlling unit 124 may determine if the ambient temperature falls within a first temperature interval R1, a second temperature interval R2, or a third temperature interval R3 beyond the predetermined temperature range Rn, and generate the control signal Sc accordingly. FIG. 2 shows a diagram illustrating the distribution of the ambient temperature according to an embodiment of the present disclosure. For example, the predetermined temperature range Rn is the temperature from T4 (e.g. −25° C.) to T5 (e.g. 65° C.). The first temperature interval R1 is the temperature from T3 (e.g. −30° C.) to T4 and the temperature from T5 to T6 (e.g. 70° C.). The second temperature interval R2 is the temperature from T2 (e.g. −35° C.) to T3 and the temperature from T6 to T7 (e.g. 75° C.). The third temperature interval R3 is the temperature from T1 (e.g. −40° C.) to T2 and the temperature from T7 to T8 (e.g. 80° C.).

Please note that the above mentioned temperatures and the ranges are not the limitations of the present disclosure. The temperature difference between T3 and T4 may be the same or different from the temperature difference between T5 and T6. The temperature difference between T2 and T3 may be the same or different from the temperature difference between T6 and T7. The temperature difference between T1 and T2 may be the same or different from the temperature difference between T7 and T8.

In addition, the first temperature interval R1 may only be the range from T3 to T4 or the range from T5 to T6. The second temperature interval R2 may only be the range from T2 to T3 or the range from T6 to T7. The third temperature interval R3 may only be the range from T1 to T2 or the range from T7 to T8.

To perform the above mentioned function, other than a computing circuit, the controlling unit 124 further comprises a storage unit for storing the above mentioned temperature data and the information related to the predetermined temperature range Rn.

In practice, when the ambient temperature falls within the first temperature interval R1, the processing circuit 122 selects a first data program scheme from a plurality of data program schemes to program the data and to write the programmed data into the storage block with triple-level cells. When the ambient temperature falls within the second temperature interval R2, the processing circuit 122 selects a second data program scheme from a plurality of data program schemes to program the data and to write the programmed data into the storage block with multi-level cells. When the ambient temperature falls within the third temperature interval R3, the processing circuit 122 selects a third data program scheme from a plurality of data program schemes to program the data and to write the programmed data into the storage block with single-level cells. In other words, when the ambient temperature deviate from the predetermined temperature range Rn is relatively large, the processing circuit 122 uses the data program scheme with relatively high reliability (and storage units with relatively high reliability) to store the data. When the ambient temperature deviate from the predetermined temperature range Rn is relatively small, the processing circuit uses the data program scheme with normal reliability to store the data. In other words, the processing circuit 122 may not use the storage units with high reliability to store the data when the ambient temperature is slightly beyond the predetermined temperature range Rn.

As shown in FIG. 1, the power management circuit 110 comprises an auxiliary power supply module 111 and a power supply module 112. In practice, the auxiliary power supply module 111 may be a battery module. As the auxiliary power supply module 111 and the power supply module 112 are arranged to supply power to the flash memory controller 120 in a complementary way, the flash memory controller 120 may always receive power from the power management circuit 110 no matter the flash memory controller 120 operates in the normal operating mode or the sleep mode.

Furthermore, when the flash memory controller 120 operates in the sleep mode, the auxiliary power supply module 111 is arranged to continuously provide a first supply power P1 to the temperature detecting circuit 121 for detecting the ambient temperature, and to selectively provide a second supply power P2 to the processing circuit 122 according to the control signal Sc. For example, when the ambient temperature is within the predetermined temperature range Rn, the auxiliary power supply module 111 does not provide the second supply power P2 to the processing circuit 122, i.e. the processing circuit 122 is powered off, for saving power. When the ambient temperature is beyond the predetermined temperature range Rn, the temperature detecting circuit 121 outputs the control signal Sc for controlling the auxiliary power supply module 111 to provide the second supply power P2 to the processing circuit 122. Therefore, the control signal Sc may be an activate signal for activating the auxiliary power supply module 111 to provide the second supply power P2 to the processing circuit 122 such that the processing circuit 122 may use a data program scheme corresponding to the ambient temperature to program and write the data into the flash memory 130.

When the flash memory controller 120 operates in the normal operating mode, the power supply module 112 is arranged to provide a third supply power P3 and a fourth supply power P4 to the temperature detecting circuit 121 and the processing circuit 122 respectively. Therefore, the control signal Sc may be regarded as an interrupt signal when the processing circuit 122 operates in the normal operating mode. The processing circuit 122 may use a data program scheme corresponding to the ambient temperature to program and write the data into the flash memory 130 according to the control signal Sc. When the flash memory controller 120 operates in the normal operating mode, the temperature detecting circuit 121 is arranged to alternately detect the ambient temperature. Therefore, the processing circuit 122 may control the power supply module 112 to alternately supply the fourth supply power P4 to the temperature detecting circuit 121 for saving power.

Please note that the present disclosure is not limited by the ways of transmitting the first supply power P1, the second supply power P2, the third supply power P3, and the fourth supply power P4 to the flash memory controller 120.

In another embodiment, the auxiliary power supply module 111 may be integrated into the flash memory controller 120.

Yet in another embodiment, the power management circuit 110 may be integrated into the flash memory controller 120.

Please refer to FIG. 2 again, the operation of writing data into the flash memory 130 by the flash memory controller 120 is described in the following paragraphs.

Figure 3:
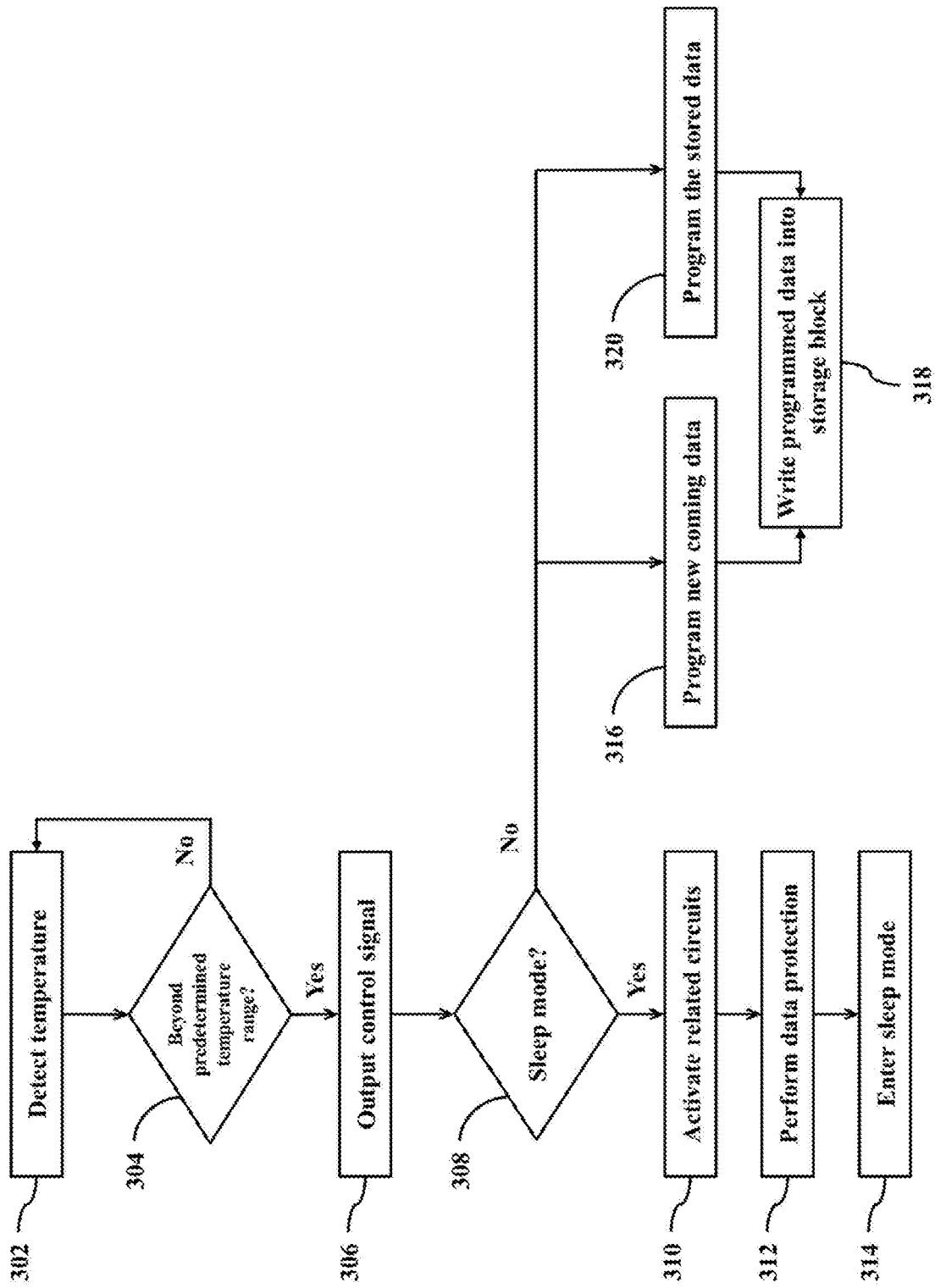
FIG. 3 shows a simplified flowchart illustrating a method of writing data into a flash memory based on the ambient temperature according to an embodiment of the present disclosure.

FIG. 3 shows a simplified flowchart illustrating a method of writing data into the flash memory 130 based on the ambient temperature according to an embodiment of the present disclosure.

In step 302, the temperature detecting unit 123 alternately detects the ambient temperature of the flash memory controller 120, and transmits the detected ambient temperature to the controlling unit 124.

In step 304, the controlling unit 124 determines if the ambient temperature is beyond the predetermined temperature range Rn. If the ambient temperature is beyond the predetermined temperature range Rn, the operation enters step 306. If the ambient temperature is not beyond the predetermined temperature range Rn, the operation goes to the step 302.

In step 306, the controlling unit 124 outputs the control signal Sc to the processing circuit 122, wherein the control signal Sc may comprise the information of the ambient temperature.

In step 308, when the processing circuit 122 receives the control signal Sc, the processing circuit 122 may first determine if the current operation mode of the flash memory controller 120 is the sleep mode or the normal operating mode. If the flash memory controller 120 operates in the sleep mode, the operation enters step 310. If the flash memory controller 120 operates in the normal operating mode, the operation enters steps 316 and 320.

In step 310, the control signal Sc activates the whole or a partial functions of the processing circuit 122. The activated circuit in the processing circuit 122 may read the data stored in the flash memory 130, and rewrite the data into the flash memory 130.

In step 312, the processing circuit 122 processes the data in the background. During the background process, the processing circuit 122 may process the data in the flash memory 130 and then store the processed data with relatively high data reliability without user intervention for protecting the data. More specifically, the processing circuit 122 is arranged to read the data in the flash memory 130, which is programmed by an original data program scheme, and program the data by another data program scheme, and then rewrite the programmed data into the flash memory 130, wherein the another data program scheme has higher data reliability than the original data program scheme.

For the example of when the flash memory 130 is a 3D NAND flash memory, the single-level cell has the highest data reliability and a storage capacity of 1 bit (i.e. the smallest storage capacity). The multi-level cell has the second highest data reliability and a storage capacity of 2 bits (i.e. the second smallest storage capacity). The triple-level cell has the third highest data reliability and a storage capacity of 3 bits (i.e. the third smallest storage capacity). The quad-level cell has the lowest data reliability and a storage capacity of 4 bits (i.e. the largest storage capacity). The other higher level cells may have the similar relationship of data reliability and storage capacity, and the detailed description is omitted here for brevity.

As the bit numbers of data to be stored into the storage units are different, the processing circuit 122 may be arranged to apply four different data program schemes to write data into the different storage units respectively. For description purposes, in step 312, the processing circuit 122 is arranged to use a predetermined data program scheme, a first data program scheme, a second data program scheme, and a third data program scheme to program and write the data into the quad-level cells, the triple-level cells, the multi-level cells, and the single-level cells respectively.

In practice, the triple-level cell, the multi-level cell, and the single-level cell may be the pTLC, the pMLC, and the SLC respectively. Therefore, the first data program scheme, the second data program scheme, and the third data program scheme may be the data program scheme applied for pTLCs, pMLCs, and SLCs respectively.

More specifically, when the flash memory controller 120 operates in the normal operating mode and the ambient temperature falls within the predetermined temperature range Rn, the flash memory 130 is configured to have the largest storage capacity to store data, i.e. the flash memory 130 is arranged to store data programmed by the 4-bit program scheme. In other words, when the ambient temperature falls within the predetermined temperature range Rn, the processing circuit 122 is arranged to use the predetermined data program scheme (e.g. the 4-bit program scheme) to program data and to write the programmed data into the quad-level cells of the flash memory 130.

When the flash memory controller 120 operates in the sleep mode and the ambient temperature is beyond the predetermined temperature range Rn, the processing circuit 122 is arranged to program the data, which is stored in the quad-level cells, into the triple-level cells, the multi-level cells, or the single-level cells, according to the extent of ambient temperature beyond the predetermined temperature range Rn. For example, as shown in FIG. 1, when the ambient temperature is slightly over the predetermined temperature range Rn (e.g. the ambient temperature is within 5° C. larger than the predetermined temperature range Rn), the processing circuit 122 may rewrite the data, which is stored in the quad-level cell, into the triple-level cells. When the ambient temperature is within 5~10° C. larger than the predetermined temperature range Rn, the processing circuit 122 may rewrite the original data into the multi-level cells. When the ambient temperature is much higher than the predetermined temperature range Rn (e.g. the ambient temperature is 10° C. larger than the predetermined temperature range Rn), the processing circuit 122 may rewrite the original data into the single-level cells.

In the above example, if the processing circuit 122 is arranged to rewrite the data into the triple-level cells, the processing circuit 122 may first use the predetermined data program scheme to read the data, and to program the data by the first data program scheme, and then to write the programmed data into the storage cells. If the processing circuit 122 is arranged to rewrite the data into the multi-level cells, the processing circuit 122 may first use the predetermined data program scheme to read the data, and to program the data by the second data program scheme, and then to write the programmed data into the storage cells. If the processing circuit 122 is arranged to rewrite the data into the single-level cells, the processing circuit 122 may first use the predetermined data program scheme to read the data, and to program the data by the third data program scheme, and then to write the programmed data into the storage cells.

To reduce the complexity of the flash memory controller 120, however, the processing circuit 122 may be arranged to directly use the third data program scheme with the highest reliability to rewrite the data into the storage units when the ambient temperature is beyond the predetermined temperature range Rn.

In addition, when the processing circuit 122 uses the first data program scheme, the second data program scheme, or the third data program scheme to write data into the triple-level cells, the multi-level cells, or the single-level cells, the processing circuit 122 may label the value of the current ambient temperature on or alongside the data. Accordingly, the processing circuit 122 may correctly decode the data stored in the storage units with the relatively high reliability (i.e. the single-level cells, the multi-level cells, or the triple-level cells). Specifically, when the ambient temperature returns to the predetermined temperature range Rn and the data is to be read out, the processing circuit 122 may acknowledge the ambient temperature at the time the data was stored by reading the label (i.e. the value of the current ambient temperature) on the data. Accordingly, the processing circuit 122 may use a corresponding decoding scheme to decode the data stored in the triple-level cells, the multi-level cells, or the single-level storage cells.

In step 314, when all data in the flash memory controller 120 are rewrote into the storage block with relatively high reliability, the flash memory controller 120 may enter the sleep mode again.

In step 316, the flash memory controller 120 operates in the normal operating mode and the ambient temperature is beyond the predetermined temperature range Rn. In this step, the processing circuit 122 may use a data program scheme with relatively high data reliability to program the new coming data and to write the programmed data into the flash memory 130 for protecting the new coming data.

For the new coming data, the processing circuit 122 is arranged to select an appropriate data program scheme to program the new coming data according to the control signal Sc and the extent of ambient temperature beyond the predetermined temperature range Rn. Briefly, as shown in FIG. 2, when the ambient temperature falls within the first temperature interval R1, the processing circuit 122 selects the first data program scheme to program the new coming data, and to write the programmed data into the storage unit (i.e. step 318). When the ambient temperature falls within the second temperature interval R2, the processing circuit 122 select the second data program scheme to program the new coming data, and to write the programmed data into the storage unit (i.e. step 318). When the ambient temperature falls within the third temperature interval R3, the processing circuit 122 select the third data program scheme to program the new coming data, and to write the programmed data into the storage unit (i.e. step 318). To reduce the complexity of the flash memory controller 120, however, the processing circuit 122 may be arranged to directly use the third data program scheme to program the new coming data, and to write the programmed data into the storage units (i.e. step 318) when the ambient temperature is beyond the predetermined temperature range Rn. As the programming operation and the writing operation of the processing circuit 122 have been disclosed in the above paragraphs, the detailed description is omitted here for brevity.

In step 320, the processing circuit 122 may also use the data program scheme with relatively high reliability to program the data that is stored in the flash memory 130, and to rewrite the programmed data into the flash memory 130. For the data that is stored in the flash memory 130, as shown in FIG. 2, the processing circuit 122 may select an appropriate data program scheme to reprogram the data according to the control signal Sc and the extent of ambient temperature beyond the predetermined temperature range Rn, and to rewrite the data into the storage block with triple-level storage cells, the multi-level cells, or the single-level cells (i.e. step 318). As the operation is similar to the operation in step 312, the detailed description is omitted here for brevity.

In step 318, the processing circuit 122 is arranged to write the programmed data into the corresponding storage block.

According to the operation steps of the processing circuit 122, the processing circuit 122 may be arranged to select a data program scheme from a plurality of different data program schemes to reprogram the data according to the extent of ambient temperature beyond the predetermined temperature range Rn. In another embodiment, without considering the extent of ambient temperature beyond the predetermined temperature range Rn, the processing circuit 122 may be arranged to directly use a data program scheme with the best data reliability to reprogram the data once the ambient temperature is beyond the predetermined temperature range Rn.

According to the above description, no matter the flash memory controller 120 operates in the sleep mode or normal operation mode, the temperature detecting circuit 121 may alternately detect the ambient temperature of the flash memory controller 120. Once the ambient temperature is beyond the predetermined temperature range Rn, the temperature detecting circuit 121 may instantly control the processing circuit 122 for performing the data protecting process.

When the flash memory controller 120 operates in the sleep mode, the processing circuit 122 is arranged to read the data stored in the flash memory 130, and to reprogram the data, and then to write the programmed data into the storage unit with relatively high data reliability in the flash memory 130. When the flash memory controller 120 operates in the normal operation mode, the processing circuit 122 not only reprograms and rewrites the data stored in the flash memory 130 by data program scheme with higher data reliability, the processing circuit 122 further programs the new coming data by data program scheme with higher data reliability, and rewrites the programmed data into storage units with higher data reliability. Accordingly, when the ambient temperature is beyond the predetermined temperature range Rn, the stored data in the flash memory 130 and the new coming data may be protected.

In addition, the processing circuit 122 may be arranged to select an appropriate data program scheme to program the data according to the extent of ambient temperature beyond the predetermined temperature range Rn, and to write the programmed data into the appropriate storage units. For example, when the ambient temperature is slightly over the predetermined temperature range Rn, the processing circuit 122 may rewrite the programmed data into storage units with relatively low data reliability and relatively large storage capacity. When the ambient temperature is much higher than the predetermined temperature range Rn, the processing circuit 122 may rewrite the programmed data into storage units with relatively high data reliability and relatively small storage capacity. Accordingly, not only the data can be protected during extreme temperature variation, the capacity of the flash memory 130 may be properly used.

Please note that the circuit configuration in FIG. 1 is an exemplary embodiment of the present disclosure, and this is not a limitation of the present disclosure.

Furthermore, provided that substantially the same result is achieved, the steps of the flowchart shown in FIG. 3 need not be in the exact order shown and need not be contiguous; that is, other steps can be intermediate. For example, the step 320 may be performed between the step 316 and the step 318, or the step 320 and the step 316 may be performed at the same time.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple", phrases "be coupled with," "couples with," and "coupling with" are is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

In practice, the "control signal" and "supply power" mentioned in the specification and the claims may be implemented as the form of voltage or current.

The foregoing is only one better embodiment of the present disclosure. The equivalent change or modification of the claims of the present disclosure fall within the scope of the present disclosure.

What is claimed is:

1. A memory controller (120), comprising:
   an interface (140), configured to operably communicate with a host device;
   a temperature detecting circuit (121), configured to operably detect an ambient temperature, wherein when the ambient temperature is outside a predetermined temperature range, the temperature detecting circuit (121) generates a control signal (Sc); and
   a processing circuit (122), coupled to the interface (140) and the temperature detecting circuit (121), the processing circuit configured to:
   select one of a plurality of data program schemes to program data into a first storage block of a flash memory (130) according to the control signal (Sc); and
   select one of the plurality of data program schemes to program data into a second storage block of the flash memory (130) according to the control signal (Sc), when the ambient temperature is outside the predetermined temperature range;
   wherein a first storage unit of the first storage block is a first bit number, a second storage unit of the second storage block is a second bit number, and the first bit number is greater than the second bit number;

wherein the first storage unit is a form of a quad-level cell (QLC), and the second storage unit is a form of one of a single-level cell (SLC), a multi-level cell (MLC), and a triple-level cell (TLC);

wherein when the ambient temperature falls within a first temperature interval outside the predetermined temperature range, the processing circuit (122) selects a first data program scheme from the plurality of data program schemes to program the data into the second storage block; when the ambient temperature falls within a second temperature interval outside the predetermined temperature range, the processing circuit (122) selects a second data program scheme from the plurality of data program schemes to program the data into the second storage block; wherein the second temperature interval is different from the first temperature interval, the first data program scheme and the second data program scheme are different.

2. The memory controller (120) of claim 1, wherein the first data program scheme and the second data program scheme are different, the first data program scheme is a 3-bit data program scheme or a 2-bit data program scheme, the second data program scheme is the 2-bit data program scheme or a 1-bit data program scheme.

3. The memory controller (120) of claim 1, further comprising:
a power management circuit (110), coupled to the temperature detecting circuit (121) and the processing circuit (122), for providing a first supply power (P3) and a second supply power (P4) to the temperature detecting circuit (121) and the processing circuit (122) respectively.

4. The memory controller (120) of claim 1, wherein the temperature detecting circuit (121) comprises:
a temperature detecting unit (123), configured to operably detect the ambient temperature of the flash memory controller; and
a controlling unit (124), coupled to the temperature detecting unit (123), for determining if the ambient temperature is outside the predetermined temperature range, and the controlling unit (124) generates the control signal (Sc) to the processing circuit (122) when the ambient temperature is outside the predetermined temperature range.

5. The memory controller (120) of claim 1, wherein when the ambient temperature is outside the predetermined temperature range, the processing circuit (122) is further arranged to reprogram the data stored in the first storage block of the flash memory (130) into the second storage block of the flash memory (130) according to the control signal (Sc), wherein a first storage unit of the first storage block is a first bit number, a second storage unit of the second storage block is a second bit number, and the first bit number is larger than the second bit number.

6. The memory controller (120) of claim 5, wherein the second storage unit is a form of one of a single-level cell, a multi-level cell, and a triple-level cell, and the first storage unit is a form of a quad-level cell.

7. A method of controlling a flash memory, comprising:
detecting an ambient temperature of the flash memory;
generating a control signal (Sc) when the ambient temperature is outside a predetermined temperature range;
selecting one of a plurality of data program schemes to program data into a first storage block of the flash memory (130) according to the control signal (Sc); and
selecting one of the plurality of data program schemes to program data into a second storage block of the flash memory (130) according to the control signal (Sc), when the ambient temperature is outside the predetermined temperature range;
wherein a first storage unit of the first storage block is a first bit number, a second storage unit of the second storage block is a second bit number, and the first bit number is greater than the second bit number;
wherein the first storage unit is a form of a quad-level cell, and the second storage unit is a form of one of a single-level cell, a multi-level cell, and a triple-level cell;
wherein the step of selecting one of the plurality of data program schemes to program the data into the second storage block of the flash memory (130) according to the control signal (Sc) comprises:
selecting a first data program scheme from the plurality of data program schemes to program the data into the second storage block when the ambient temperature falls within a first temperature interval outside the predetermined temperature range; and
selecting a second data program scheme from the plurality of data program schemes to program the data into the second storage block when the ambient temperature falls within a second temperature interval outside the predetermined temperature range;
wherein the second temperature interval is different from the first temperature interval;
wherein the first data program scheme and the second data program scheme are different, the first data program scheme is a 3-bit data program scheme or a 2-bit data program scheme, the second data program scheme is the 2-bit data program scheme or a 1-bit data program scheme.

8. The method of claim 7, wherein the first data program scheme and the second data program scheme are different, the first data program scheme is a 3-bit data program scheme or a 2-bit data program scheme, the second data program scheme is the 2-bit data program scheme or a 1-bit data program scheme.

9. The method of claim 7, further comprising:
reprograming the data stored in a first storage block of the flash memory (130) into the second storage block of the flash memory (130) according to the control signal (Sc), wherein a first storage unit of the first storage block is a first bit number, a second storage unit of the second storage block is a second bit number, and the first bit number is larger than the second bit number.

10. The method of claim 9, wherein the second storage unit is a form of one of a single-level cell, a multi-level cell, and a triple-level cell, and the first storage unit is a form of a quad-level cell.

* * * * *